United States Patent [19]

Winstanley et al.

[11] Patent Number: 5,246,340
[45] Date of Patent: Sep. 21, 1993

[54] INTERNALLY COOLED AIRFOIL

[75] Inventors: David K. Winstanley, Mesa; John K. Phillips, Phoenix, both of Ariz.

[73] Assignee: Allied-Signal Inc., Morris Township, Morris County, N.J.

[21] Appl. No.: 794,756

[22] Filed: Nov. 19, 1991

[51] Int. Cl.5 .................................................. F01D 5/08
[52] U.S. Cl. ................................ 416/97 R; 415/115; 416/90 R; 416/233
[58] Field of Search ............... 415/115; 416/90 R, 95, 416/96 R, 96 A, 97 R, 97 A, 233; 29/889.72

[56] References Cited

U.S. PATENT DOCUMENTS

| | | |
|---|---|---|
| 2,248,221 | 7/1941 | Dornier ............................ 416/233 |
| 2,659,444 | 11/1953 | Stanley . |
| 3,237,850 | 3/1966 | Troller . |
| 3,628,226 | 12/1971 | Neleen . |
| 3,732,031 | 5/1973 | Bowling et al. . |
| 3,736,638 | 6/1973 | Stone, Jr. . |
| 4,056,332 | 11/1977 | Meloni ............................... 415/115 |
| 4,089,456 | 5/1978 | Toppen et al. . |
| 4,221,539 | 9/1980 | Corrigan . |
| 4,601,638 | 7/1986 | Hill et al. ............................ 415/115 |
| 4,815,939 | 3/1989 | Doble . |
| 4,827,587 | 5/1989 | Hall et al. . |
| 5,083,371 | 1/1992 | Leibfried et al. ................. 29/889.72 |

Primary Examiner—Edward K. Look
Assistant Examiner—Mark Sgantzos
Attorney, Agent, or Firm—James W. McFarland; Robert A. Walsh

[57] ABSTRACT

A hollowed, internally cooled airfoil per gas turbine engines with an improved internal configuration for pronounced impingement cooling. Internal ribs extend across the hollowed interior and cooling passages through these ribs cause impingement cooling of the next-adjacent rib as well as the internal surfaces of both the pressure side and suction side of the airfoil.

7 Claims, 3 Drawing Sheets

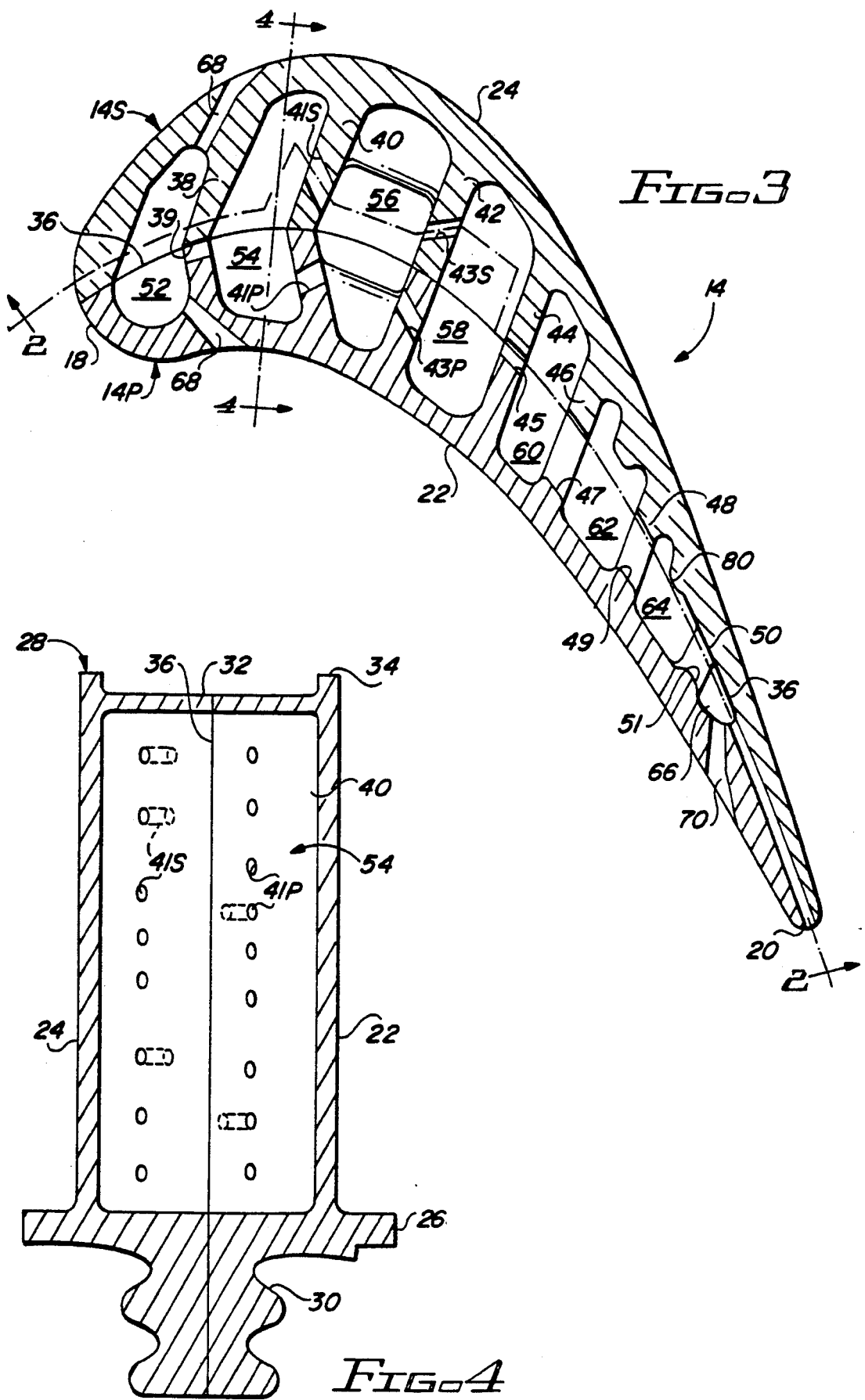

INTERNALLY COOLED AIRFOIL

TECHNICAL FIELD

This invention pertains to gas turbo machinery and relates more particularly to improved internal configurations for hollowed, internally cooled fluid foils.

BACKGROUND OF THE INVENTION

Operational efficiencies of gas turbine engines increase as engine operating temperatures increase. To increase maximum engine temperature allowed by a particular material, modern gas turbine engines utilize internally cooled turbine blades and vanes in the hotter portions of the engine that first receive the hot motive gas flow generated by the engine combustor. The internal geometry of the cooling cavities and passages of such gas turbine blades or vanes may become relatively geometrically complicated in order to promote the most efficient heat exchange, and therefore cooling, of the turbine blade or vane. Some require rather sophisticated manufacturing techniques, such as laminations, to produce the desired internal geometries.

Appropriate cooling design is further complicated by the nonuniform temperature distribution across the length and span of the blade, the necessity to optimize the difference between the leading edge average temperature and the bulk average temperature of the blade to minimize thermal stresses, and the continual need to minimize the total volume of cooling flow utilized as the latter represents a parasitic power loss to the overall engine.

SUMMARY OF THE INVENTION

The present invention contemplates such an improved, hollowed fluid foil that receives a heat exchange fluid in the interior thereof, wherein efficient impingement cooling is maximized in major portions of the blade subject to the greatest temperature extremes.

More particularly, the present invention contemplates a hollowed, internally cooled gas turbine blade or vane having radial internal ribs dividing the interior of the blade or vane in to a plurality of cavities, each of the ribs having passages therethrough for allowing cooling fluid flow to pass sequentially through the various internal cavities. At least one of the internal ribs, in the area wherein the blade or vane is subject to the greatest temperature extreme, extends nonlinearly or indirectly across the blade such that the associated passages extending through this internal rib direct a cooling fluid flow toward the corners formed at the next adjacent rib with both the pressure side and suction side of the blade. Preferably such internal rib and passage configuration is manufactured by fabricating the blade or vane in two halves, a pressure half and a suction half, which are then joined through known bonding techniques along a bond line extending somewhat near the mean camber line of the vane or blade. Prior to bonding, the associated passages may be formed by, for instance, electrical discharge machining (EDM) or electrochemical machining (ECM).

The present invention is particularly suitable for smaller sized turbine blades and vanes wherein the internal cavities and passages are also quite small and therefore more difficult to manufacture. It is especially useful in such configurations wherein the passages carrying the cooling airflow have a length to diameter ratio of less than about 3, wherein the direction of airflow issuing therefrom is determined by the direction of the wall through which the passage is drilled, rather than by the direction of hole drilling.

Additionally, the present invention contemplates an arrangement for effective cooling of the internal ribs extending across the internal space of the blade or vane between the pressure and suction sides 0 thereof, such that the cooled ribs then act as additional heat sinks for the hot surfaces of the blade or vane. Yet, mechanically, the cooled ribs are capable of greater load carrying capacity.

These and other more particular advantages and objects of the present invention are specifically set forth in or will become apparent from the following detailed description of preferred embodiments of the invention, when read in conjunction with the accompanying drawings.

BRIEF DESCRIPTION OF THE DRAWINGS

FIG. 3 is a top plan cross-sectional view taken along lines 3—3 of FIG. 2;

FIG. 4 is a front elevational cross-sectional view taken along lines 4—4 of FIG. 3.

DETAILED DESCRIPTION OF THE PREFERRED EMBODIMENT

Figure 1:
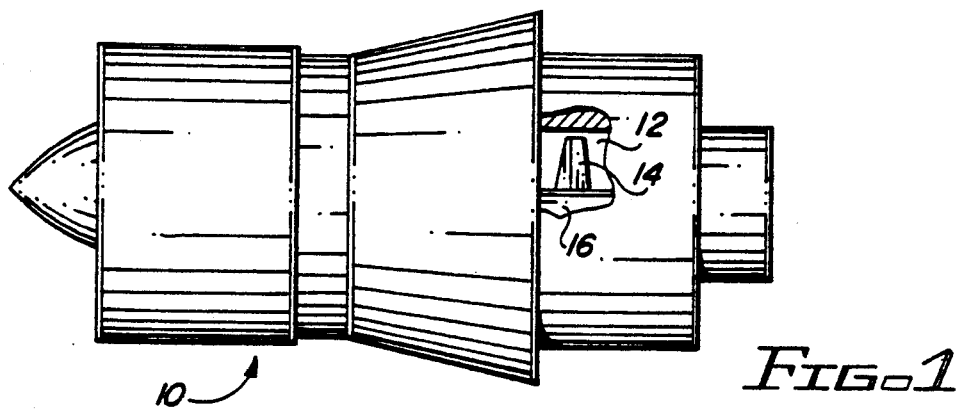
FIG. 1 illustrates a gas turbine engine having an improved blade as contemplated by the present invention.
Figure 2:
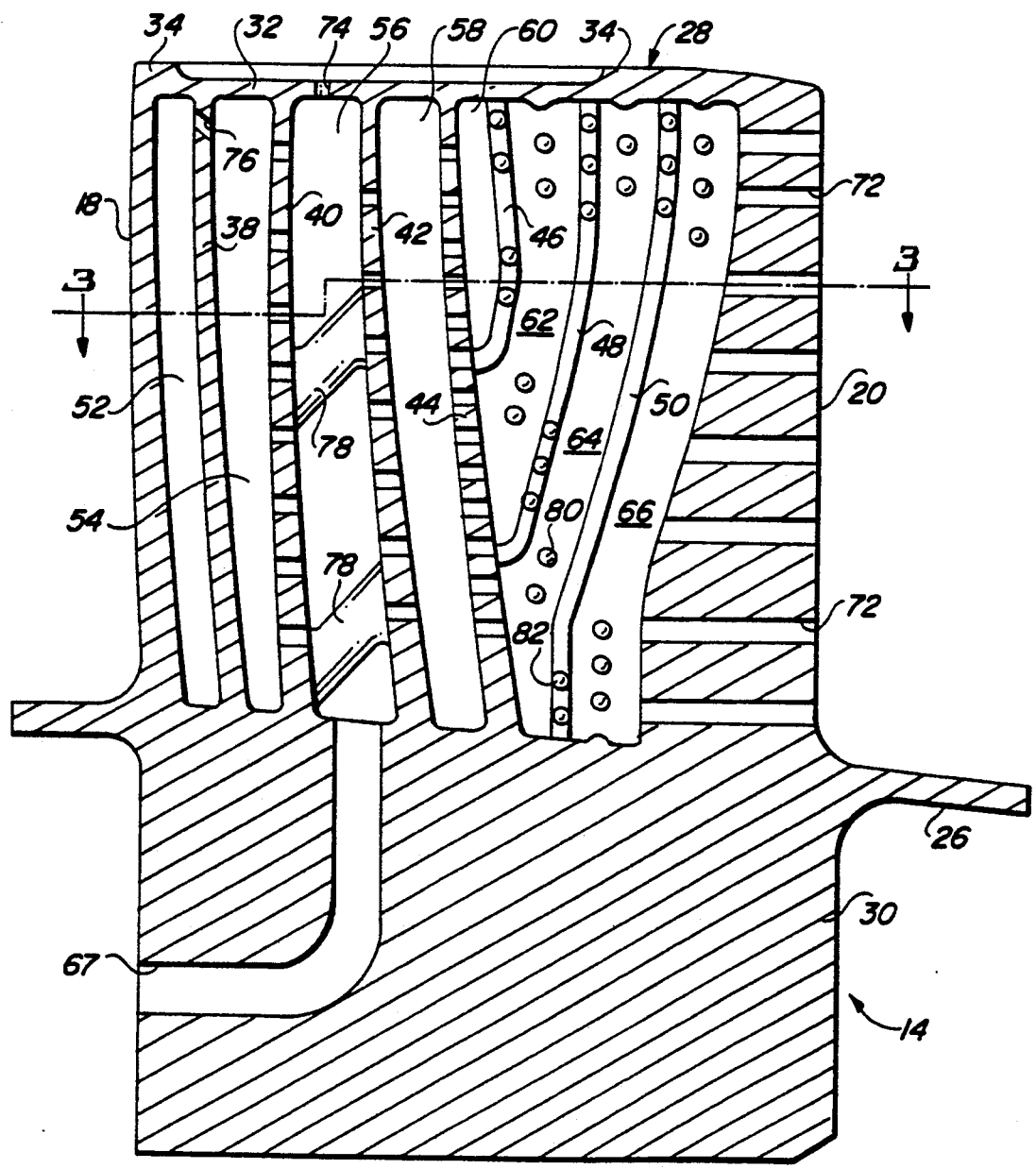
FIG. 2 is an elevational cross-sectional view extending irregularly along the length of the core of a turbine blade constructed in accordance with the principles of the present invention, as taken along lines 2—2 of FIG. 3.

Referring now more particularly to FIGS. 1-4, a gas turbine engine denoted by the numeral 10 includes a hot gas carrying passage 12 having an axial turbine blade 14 extending radially from the center line of the rotating hub of a rotary turbine wheel 16. Conventionally, blade 14 extends in a generally axial direction from a leading edge 18 toward a trailing edge 20 relative to the motive gas flow passing thereby. As best illustrated in FIG. 3, the blade 14 is arcuately curved in a chord-wise direction extending along the central mean camber line from the center of the leading edge 18 to the trailing edge 20. The blade extends tangentially in a circumferential direction relative to rotation of wheel 16 and has a pressure side 22 spaced circumferentially from a suction side 24. FIGS. 2 and 4 clearly illustrate that the turbine blade extends radially from an inner or bottom platform 26 to a top platform 28. Typically, the bottom platform 26 may have a dovetail configuration 30 for intersecurement in a correspondingly configured dovetail groove in the hub of the turbine wheel 16 for intersecurement therewith. Also in known fashion, the top platform 28 includes a tip cap portion 32 surrounded by an upstanding squealer tip 34.

While blade 14 may be manufactured in a variety of manners, a preferred approach contemplates casting two blade halves 14P, 14S. As best illustrated in FIG. 3 the subsequent bond line for these two castings halves is represented by the line 36 and extends generally near the mean camber line of the blade 14. Alternately, the two blade halves 14P, 14S may be machined from stock. If cast from single crystal alloys, both halves 14P, 14S are grown by known seeding techniques to avoid high angled grain boundaries at the bond joint. Prior to bonding of the two blade halves, internal cooling passages, as needed, may be created by electrical discharge machining or by electrochemical machining. Once all internal blade geometry machining is completed, the two blade halves are then bonded together by conventional bonding techniques suitable for the superalloys normally utilized for gas turbine blades. After bonding, the final external airfoil shaping and the forming of dovetail 30 are accomplished through machining as needed.

Turning now to the internal geometry of blade 14, a plurality of tangential or circumferentially extending ribs 38, 40, 42, 46, 48, and 50 extend internally across the hollowed interior of blade 14 between the pressure side 22 and suction side 24. These ribs 38-50 define a plurality of span-wise extending internal cavities 52, 54, 56, 58, 60, 62, 64 and 66. These cavities 52-66 are spaced in a chord-wise direction from one another, being separated by the ribs 38-50, and a mid-chord located cavity 56 communicates with a cooling air supply passage 67 extending radially inwardly into the dovetail region of the blade for receiving cooling air flow from another part of the engine. The internal ribs have associated passages 39, 41P, 41S, 43P, 43S, 45, 47, 49 and 51, all of which facilitate delivery of the cooling air flow to the adjacent cavities in a generally chordwise direction along the blade 14.

The smaller drilled passages 39, 41P, 41S, 43P, 43S, and 45 preferably are drilled through electrical discharge machining or electrochemical machining of the two separate halves 14P, 14S before bonding thereof. Additionally, the blade 14 is configured with exhaust apertures 68, 70 and 72, only a portion of which are illustrated in the drawings, for the purpose of exhausting the cooling air flow from the interior cavities to the exterior of the blade on either the pressure side 22, the suction side 24, or at the trailing edge 20 thereof. Additionally, midchord cavity 56, and/or other cavities, may include one or more exhaust passages 74 extending through the tip cap 32. These exhaust apertures assure continuous flow of cooling air flow into, through, and out of the interior of the hollowed blade 14.

A very important aspect of the present invention relates to the configuration of ribs 40, 42 and their associated passages 41P, 41S, 43P and 43S. More particularly, it will be noted in FIG. 3 that the internal ribs 38 and 40 do not extend across the interior of the blade 14 in a straight line. Each of the ribs 38 and 40 is comprised of a pair of segments, one associated with each of the casting halves 14P, 14S. The straight segments of rib 38 are angled to one another and joined at the bond line 36. Similarly, each of the segments making up rib 40 are straight or linear, but are angled to one another and are joined at the bond line. Thus, each of the ribs 38, 40 extend indirectly across the interior of the hollowed blade 14 between the pressure side and suction side.

The two columns of passages 41P, 41S associated with the nonlinear rib 40 are drilled at an angle therethrough rather readily prior to bonding of the casting halves 14P and 14S. More particularly, passages 41P are aligned such that cooling air flow issuing therefrom from cavity 56 is directed into the adjacent cavity 54 to impinge substantially at the corner formed between the next adjacent rib 38 and the internal surface of the pressure side 22 of the turbine blade. Because of the angulation of the segment of rib 40 which carries the passages 41P, these passages 41P are at a substantially right angle to the segment of the rib 40. As a net result, the cooling air flow impinges directly upon the above-mentioned corner. Thus the cooling airflow impinges directly upon substantial portions of both the internal surface of the pressure side 22 as well as upon the next adjacent rib 38.

Thus, the configuration and arrangement of passages 41P and the associated rib 40 assure that the cooling air flow issuing into cavity 54 impinges upon a substantial portion of both the internal surface of the pressure side 22 as well as upon the next adjacent rib 38 This promotes very effective impingement cooling of both the pressure side 22 as well as rib 38. Because the passage 41P is extending almost perpendicularly through the associated segment of the internal rib 40, the diameter of passage 41P can be substantially large in comparison to the thickness of rib 40; yet the direction of cooling air flow issuing therethrough will still assure impingement adjacent the corner of the next adjacent rib to promote the impingement cooling upon both mentioned walls. In otherwords, the length-to-diameter ratio of the passage 41P may be significantly less than three, and impingement cooling will still occur upon both of the internal surface of pressure side 22 and the next adjacent rib 38. In this regard, air flow through a passage in a wall will generally follow the direction of that passage so long as its length-to-diameter ratio is approximately three or higher. If the length-to-diameter ratio is less than three, the air flow through such a passage tends to be perpendicular to the plane of the wall through which the aperture or passage extends. Thus, with the present invention the passage 41P may be of substantially large diameter in comparison to its length through the rib 40 so as to allow significant air flow therethrough, yet still assuring that the air flow is issuing toward the corner formed at the next adjacent rib. This is especially important for passages 41P because flow in the forward end of the blade must exhaust through apertures 68 into a relatively high pressure region external to blade 14. This means there is a lower pressure differential between cavity 56 and apertures 68 for forcing cooling flow through passages 41P. By allowing passage 41P to be relatively large, i.e. length-to-diameter ratio less than three, sufficient cooling air flow occurs therethrough even with the minimized pressure differential.

In a similar manner it will be seen that the passages 41S are drilled in a line such that cooling air flow passing therethrough from cavity 56 into cavity 54 is also directed toward the corner formed between the next adjacent rib 38 and the internal surface associated with suction side 24. By being directed towards this corner, impingement cooling occurs across a large portion of the internal surface associated with section side 24, as well as upon the next adjacent rib 38. Like cooling air flow through passage 41P, this resulting impingement cooling caused by the cooling air flow issuing through passage 41S maximizes the heat exchange effects and maximizes cooling of the turbine blade in a region wherein the blade 14 is exposed to higher temperatures. The configuration of the segment of rib 40 associated with the suction side casting 14S assures that the associated passage 41S has a significantly higher length-to-diameter ratio than the associated passage 41P. This, coupled with the angulation of passage 41S, assures that the fluid flow issuing from passage 41S into the adjacent cavity 54 is generally toward the corner between the next adjacent rib 38 and the internal surface of the suction side 24.

Upon inspection of FIG. 4, it will be apparent that the passages 41P and 41S comprise a column of passages extending spanwise or radially along the rib 40. Importantly, the passages 41P, 41S can also be spaced and arranged to produce preferential cooling by controlling the volume of cooling air flow directed into different portions of the cavity 54. For example, in FIG. 4 it will be apparent that there are a greater number of passages 41P than passages 41S inasmuch as the pressure side 22 of the turbine blade requires greater cooling flow than the suction side 24. Similarly, the more critical temperature zone of such a turbine blade 14 tends to be towards the central portion thereof in a spanwise direction, i.e. in a direction from the bottom platform 26 towards the top platform 28. Accordingly, each of the passages 41P and 41S are arranged in greater concentration in the midspan portion of the blade than in those portions more adjacent either the bottom platform 26 or the top platform 28.

Impingement cooling directly upon the internal surfaces associated with pressure side 22 and suction side 24 within the cavity 54 is important as it promotes maximum cooling of the blade in these regions. Impingement cooling upon the next adjacent rib 38 is also important inasmuch as the cooled rib 38 now acts as a heat sink so that greater heat may be removed from the blade through conduction in to the internal rib 38. Additionally, this impingement cooling of rib 38 is important from a mechanical point of view inasmuch as the cooled rib 38 is better able to carry the blade loading.

An additional advantage of the present invention is apparent from FIG. 2 by inclusion of one or more radially angled passages 76 in rib 38. Passage 76 directs cooling air flow to impinge directly upon the tip cap 32 in an area adjacent the squealer cap 34 near the leading edge 18 of the blade. Such impingement cooling produces higher internal heat transfer coefficient, allowing additional cooling of the squealer cap adjacent the leading edge via conduction through the tip cap 32.

The present invention thereby improves the internal heat transfer coefficients in comparison to relying merely upon convection heat transfer from the pressure side and suction side of the blades. Yet the present invention accomplishes this improved heat transfer with a relatively simplified internal cooling configuration in comparison to prior art. For example, prior art attempts to produce impingement cooling upon the internal surfaces associated with the pressure side and the suction side of a blade characteristically involved utilization of a double internal wall. When viewing internal ribs 38 and 40 it will be apparent that the internal geometry of the hollowed blade of the present invention is vastly simpler than characteristic of a majority of the prior art arrangements. This is attributable to the configuration of rib 40, and its nonlinearity in extending from the pressure side 22 towards the suction side 24, as well as the angulation of the associated passages 41P, 41S to allow direct impingement cooling towards the corners formed between the next adjacent rib 38 and the internal surfaces of the pressure side and suction side.

Cooling air flow from the midspan cavity 56 in passing rearwardly towards the trailing edge 20 of the blade will ultimately exhaust through passages such as those illustrated at 70 and 72. Significantly, exhausting cooling air flow passing through apertures 70 and 72 dump in to an external region of significantly lower pressure than normally encountered by aperture 68. Thus, there is substantially greater pressure differential for inducing cooling air flow to pass from cavity 56 toward the trailing edge of the blade, and thus to pass through the intermediate cavities 58, 60, 62, 64 and 66. Accordingly, the internal rib 42 may be linear in configuration extending in a straight line between the pressure side and suction side. The associated passages 43S, and 43P are of substantially smaller diameter than the passages 41P and 41S. Because of the greater pressure differential in air flow passing through passages 43S, and 43P these latter passages may be of substantially smaller diameter and yet carry necessary cooling air flow as required by the blade. Because the diameter of passages 43P, 43S are significantly smaller, there length-to-diameter ratio can be on the order of approximately three to one. Importantly, and similar to passages 41P, 41S, the passage 43P is aligned such that its axis is directed substantially towards the corner formed between the next adjacent rib 45 and the pressure side internal surface. Similarly, the passage 43S is arranged such that fluid flow issuing therefrom is directed substantially at the corner formed between next adjacent rib 45 and the internal surface associated with suction side 24. Accordingly, impingement cooling again occurs on the internal surfaces of both the pressure side and suction side in the region of cavity 58, along with impingement cooling of the next adjacent rib 44. In this manner, the rib 42 and its associated passages 43P, 43S are configured and arranged such that the cooling air flow passing therethrough does cause impingement cooling in the same manner as set forth above with respect to passages 41P and 41S.

The present invention, with its relatively simplified geometry, may be utilized in conjunction with other known heat exchange geometrical configurations. For example, the internal supply cavity 56 may include a plurality of turbulators 78 associated with the internal surfaces on both the pressure side and suction side. Also, as best illustrated in FIG. 2, the walls 46, 48 and 50 may comprise a series of tubulators 80 extending a short distance from the internal surfaces of the pressure side and suction side, and/or may include a plurality of pin fins 82 extending substantially across the tangential or circumferential width of the blade. Such heat exchange fins and tubulators are typical and well known within the art.

Figure 5:
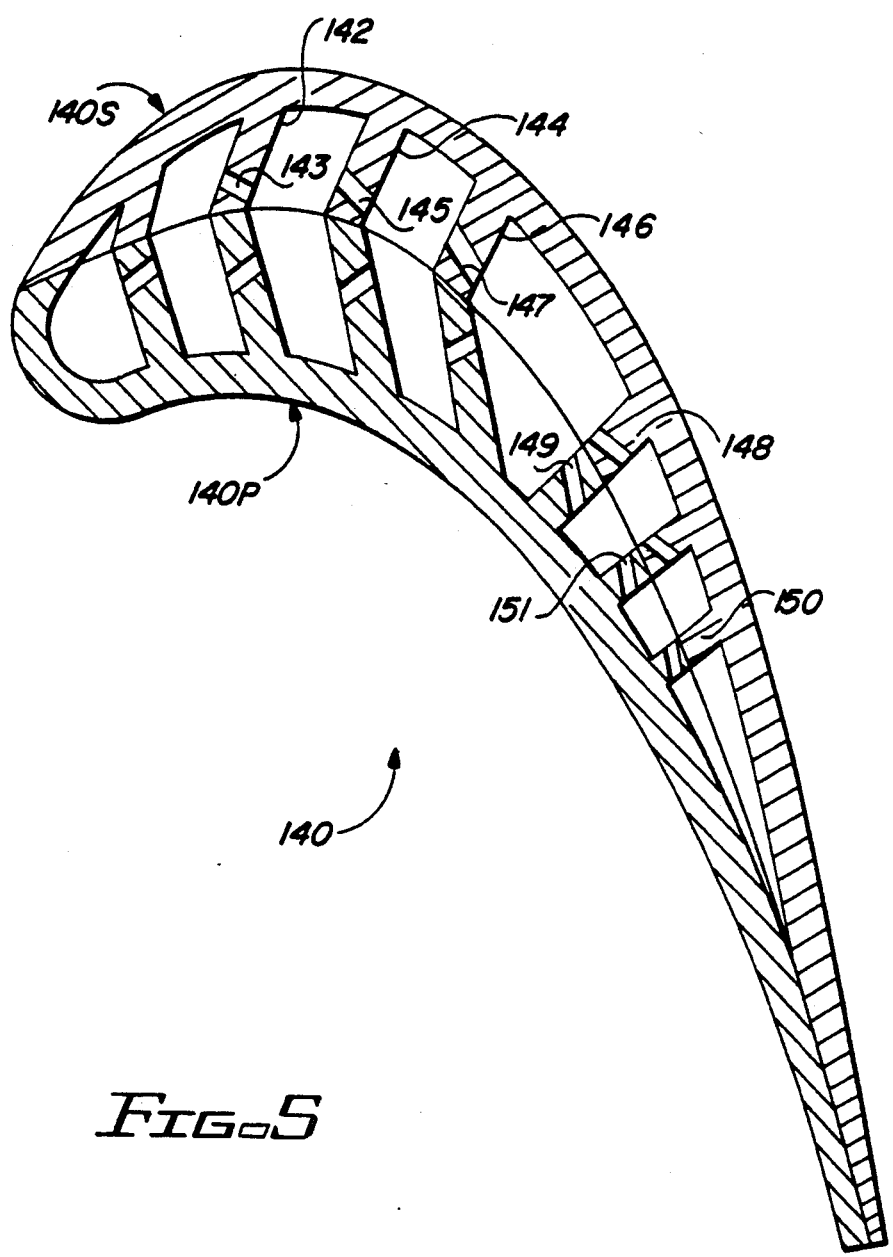
FIG. 5 is a view similar to FIG. 3 but showing a modified version of the present invention.

FIG. 5 illustrates an alternative form of the invention wherein a turbine blade 140 includes three internal ribs 142, 144 and 146 each of which is of nonlinear configuration in the same manner as discussed above with respect to blade 40 of FIG. 3. Associated passages 143, 145 and 147 therewithin are configured and arranged as discussed previously such that cooling air flow passing therethrough issues directly toward the corners form between the next adjacent blade and the internal surface of both the pressure side and the suction side of the turbine blade 140. For the configuration illustrated in FIG. 5, it will be apparent in that the bond line between the pair of casting halves 140P and 140S is offset further from the main camber line of the blade near the leading edge of the blade. While increasing complexity of the casting process, the blade of FIG. 5 offers yet further improved efficiency of heat exchange cooling by increasing the regions of both the pressure side and the suction side which are subject to direct impingement cooling. Additionally, blade 140 includes a pair of ribs 148, 150 which are linear but which have associated passages 149, 151 therewithin which have a length-to-diameter ratio of approximately three or greater so that cooling air flow again impinges not only upon the internal surfaces of the pressure side and suction side, but also impinges upon the next adjacent internal rib. Various other internal features, including the exhaust apertures are not illustrated in FIG. 5 for purposes of clarity.

From the foregoing it will be apparent that the present invention contemplates an improved internal geometry for a fluid foil such that internal heat transfer coefficients are dramatically increased. This allows operation of the fluid flow at a higher temperature, such as when operating as a turbine blade or vane, or alternately allows a reduced flow of cooling air to minimize parasitic power losses. The concepts of the present invention are readily adaptable to a heat exchange arrangement with a fluid foil which must be heated, rather than cooled. In such instance the heat exchange fluid delivered in to the hollowed interior of the fluid foil would be a heating fluid rather than a cooling fluid.

While the present invention has been described with respect to the preferred manner of manufacture, cast in two blade halves, the fluid foil may be made by other techniques such as laminates, or cast as a single casting. These and other alterations and modifications of the particular arrangements illustrated and described in detail above will be apparent to those skilled in the art. Accordingly, the foregoing should be considered exemplary in nature and not as limiting to the scope and spirit of the invention as set forth in the appended claims.

Having described the invention with sufficient clarity that those skilled in the art may make and use it, I claim:

1. A hollowed, axial turbine fluid foil having a pressure side and a suction side each extending in a chord-wise direction from a leading edge to a trailing edge of the fluid foil; a plurality of internal ribs extending internally across the fluid foil between the pressure and suction sides to define separate internal cavities spaced in a chord-wise direction from one another; means for supplying heat exchange fluid into a mid-chord located one of said cavities, said internal ribs having passages therethrough for delivering heat exchange fluid to adjacent cavities in a generally chord-wise direction, at least one of said internal ribs and its associated passages being configured and arranged whereby heat exchange fluid flowing through said associated passages impinges the internal surfaces of both said pressure side and suction side of the fluid foil and impinges the next adjacent internal rib to produce impingement heat exchange therewith, said one internal rib and its associated passages arranged whereby fluid flowing through said associated passages issues substantially directly toward corners formed between the next adjacent rib and the internal surfaces of said pressure side and said suction side; and said one internal rib including first and second straight segments extending respectively from the pressure and suction sides and joined with one another, said first and second segments being angled to one another.

2. A fluid foil as set forth in claim 1, wherein said first segment extends substantially perpendicular to the direction between said associated passage and the corner formed between the next adjacent rib and the internal surface of said pressure side.

3. A fluid foil as set forth in claim 2, wherein said second segment extends substantially perpendicular to the direction between said associated passage and corner formed between the next adjacent rib and the internal surface of said suction side.

4. A fluid foil as set forth in claim 1, wherein said fluid foil is a two part casting, the casting part plane extending span-wise through said fluid foil and generally near the mean camber line of the fluid foil.

5. A fluid foil as set forth in claim 1, wherein said associated passages of said one internal rib have a length-to-diameter ratio of less than about three.

6. A fluid foil as set forth in claim 1, further including apertures extending through said fluid foil for exhausting said heat exchange fluid from the hollowed interior thereof.

7. In a gas turbine engine, an internally cooled, hollowed axial turbine airfoil, said airfoil extending (a) in a chord-wise direction from axially spaced leading and trailing edges, (b) in a span-wise direction between radially spaced bottom- and top platforms and (c) tangentially in a circumferential direction between pressure and suction sides of the airfoil; said airfoil comprising a pressure side casting and suction side casting joined in a chord-wise extending plane; internal ribs extending internally tangentially across the hollowed interior of the airfoil to define separate, chord-wise spaced internal cavities; means for supplying cooling airflow radially into a mid-chord located one of said cavities, said internal ribs having passages therethrough for delivering cooling airflow to adjacent cavities in a generally chord-wise direction, at least one of said ribs comprised of a pair of straight segments extending obliquely to one another with associated passages disposed in each of said pair of straight segments whereby cooling airflow therethrough issues substantially directly toward the corners formed between the next adjacent rib and the internal surfaces of said pressure side and said suction side.

* * * * *